United States Patent [19]

Zindler

[11] 4,253,556
[45] Mar. 3, 1981

[54] CLUTCH-BRAKE MECHANISM

[76] Inventor: Hugh A. Zindler, Rte. #3, Pleasant Valley La., Watertown, Wis. 53094

[21] Appl. No.: 35,683

[22] Filed: May 3, 1979

[51] Int. Cl.³ .................. F16D 43/20; F16D 67/02; F16D 43/24; F16D 13/71
[52] U.S. Cl. .................................. 192/17 R; 192/54; 192/89 R; 192/103 C; 192/105 BA
[58] Field of Search ............... 192/17 R, 17 A, 17 C, 192/12 R, 12 C, 54, 89 R, 93 R, 103 C, 103 B, 105 BA; 56/10.5, 11.3

[56] References Cited

U.S. PATENT DOCUMENTS

| 2,947,399 | 8/1960 | Moore et al. | 192/105 BA |
|---|---|---|---|
| 3,696,901 | 10/1972 | Henry | 192/105 BA |
| 3,810,533 | 5/1974 | Denson | 192/105 BA |
| 3,971,463 | 7/1976 | Zindler | 192/105 BA |
| 4,044,533 | 8/1977 | Wick | 56/10.5 |

FOREIGN PATENT DOCUMENTS

2804799  3/1979  Fed. Rep. of Germany ............ 56/11.3

*Primary Examiner*—George H. Krizmanich
*Attorney, Agent, or Firm*—Andrus, Sceales, Starke & Sewall

[57] ABSTRACT

Segmental clutch shoes are operatively deployed between coaxial drive and driven members and are movable radially and circumferentially therebetween into and out of clutching engagement with a drum on the drive member. Equiangularly spaced projections are provided on the driven member corresponding to the number of clutch shoes and extend into recesses provided in the shoes. The trailing side of the projections are each provided with a cam ramp engageable by the shoe. The shoes are normally biased outwardly toward engagement with the rotating drum, and upon initial contact with the drum, are forced circumferentially into contact with the cam ramp. The load imposed on and by the driven member gives rise to a reactive energizing force to effect movement of the shoes outwardly on the cam ramp and into clutching engagement with the rotating drum to rotationally pick up the driven member. A brake band member extends around the periphery of the segmental clutch shoes and is movable between an expanded condition wherein the band is spaced from the shoes and a contracted condition wherein the band engages the shoes to displace the shoes inwardly out of clutching engagement with the drum and to stop rotation of the driven member without interrupting the rotation of the drive member.

25 Claims, 12 Drawing Figures

CLUTCH-BRAKE MECHANISM

BACKGROUND OF THE INVENTION

This invention relates to a clutch-brake mechanism for disposition in the drive transmission of powered implements and machinery. The mechanism is interposed between a drive and driven member and provides for simultaneous disengagement of the clutch and braking of the driven member without interruption of the power source.

Reference is made to the clutch-brake mechanism for a lawn mower disclosed in FIGS. 2 and 3 of Wick U.S. Pat. No. 4,044,533. The referenced patent discloses a straight centrifugal clutch design wherein a pair of segmental clutch shoes associated with a driven member are intended to move radially into and out of clutch engagement with a drive member. In the referenced patent, springs are depicted for normally biasing the clutch shoes outwardly to make the intended driving engagement with the drive member. In the straight centrifugal clutch design, radial movement of the clutch shoes outwardly to engage and clutch the drive member would be accomplished solely by springs. With relatively light springs biasing the clutch shoes outwardly in the referenced structure, even with up to 40 lbs. of radial spring force per shoe, inadequate load pickup characteristics will likely be evidenced resulting in substantial slippage of the clutch and generation of such high temperatures in the mechanism that annealing and weakening of the springs and other parts is likely along with creation of a fire hazard in any fire prone environment. If, on the other hand, relatively heavy springs are used to bias the clutch shoes outwardly with reasonable assurance of lock-in, the clutch size to accommodate the heavy springs will likely be impractical for applications such as lawn mowers, and/or a fatiguing manual force on a deadman control or the like would be necessary to actuate the braking springs needed to override the clutch springs, and/or the sudden application of end load inertia likely would immediately stall and kill the power source.

Reference is also made to Weber U.S. Pat. No. 2,675,103 which also discloses a straight centrifugal clutch that relies solely on springs to energize the clutch.

It is generally an object of this invention to provide a centrifugal clutch design which does not rely solely on springs to energize the clutch shoes and therefore relatively light springs may be utilized. With light springs the clutch unit can be reasonably small and therefore compatible for use in lawn mowers, chain saws and other relatively small powered implements.

SUMMARY OF THE INVENTION

Generally, the clutch-brake mechanism of this invention is disposed between rotatable drive and driven members. A drum is carried on the drive member. Segmental clutch shoes are disposed between the driven member and the drum and are movable radially and circumferentially therebetween into and out of clutching engagement with the drum. Equiangularly spaced projections are provided on the driven member and correspond to the number of clutch shoes. The projections extend outwardly into corresponding recesses provided in the respective clutch shoes. A cam ramp is provided on the trailing side of each projection and is engageable by the corresponding shoe. The radially outermost end of the cam ramp is angularly advanced relative to the radially innermost end thereof. Means are provided for effecting movement of the shoes generally radially toward engagement with the rotating drum, and upon making contact with the drum, the shoes are forced circumferentially into contact with the corresponding cam ramp. The load imposed on and by the driven member gives rise to a reactive energizing force which effects movement of the clutch shoes outwardly on the cam ramps and into clutching engagement with the rotating drum to rotationally pick up the driven member. A braking surface is provided on the clutch shoes. A brake band member is disposed circumferentially of the clutch shoes and is movable between an expanded condition out of contact with the clutch shoes and a contracted condition wherein the brake band member engages with the braking surfaces on the clutch shoes to displace the shoes inwardly out of clutching engagement with the drum and to stop rotation of the driven member without interrupting rotation of the driven member.

DESCRIPTION OF THE DRAWING FIGURES

The drawings furnished herewith illustrate the best mode presently contemplated for carrying out the invention and are described hereinafter.

In the drawings.

DESCRIPTION OF THE ILLUSTRATED EMBODIMENTS

Referring to the drawings, the clutch-brake mechanism 20 of FIGS. 1-4 is operatively disposed between the drive shaft 21 driven by an engine or other power source, not shown, and a driven member 22. The mechanism 20 of FIGS. 1-4 is specifically intended for use in a chain saw wherein the driven member 22 carries a sprocket 23 for driving a saw chain, not shown, but is readily adaptable for use between the drive and driven members in other applications.

In the embodiment of FIGS. 1-4, the stepped drive shaft 21 projects axially through the opening 24 into the housing 25, shown only in part. A bearing sleeve 26 is disposed on the shaft 21 and is axially confined between the washer 27 abutting on the shaft shoulder 28 and the end nut 29. The drive shaft 21 carries a drum 30 adjacent to the free end thereof and which may be integral with the end nut 29.

Figure 1:
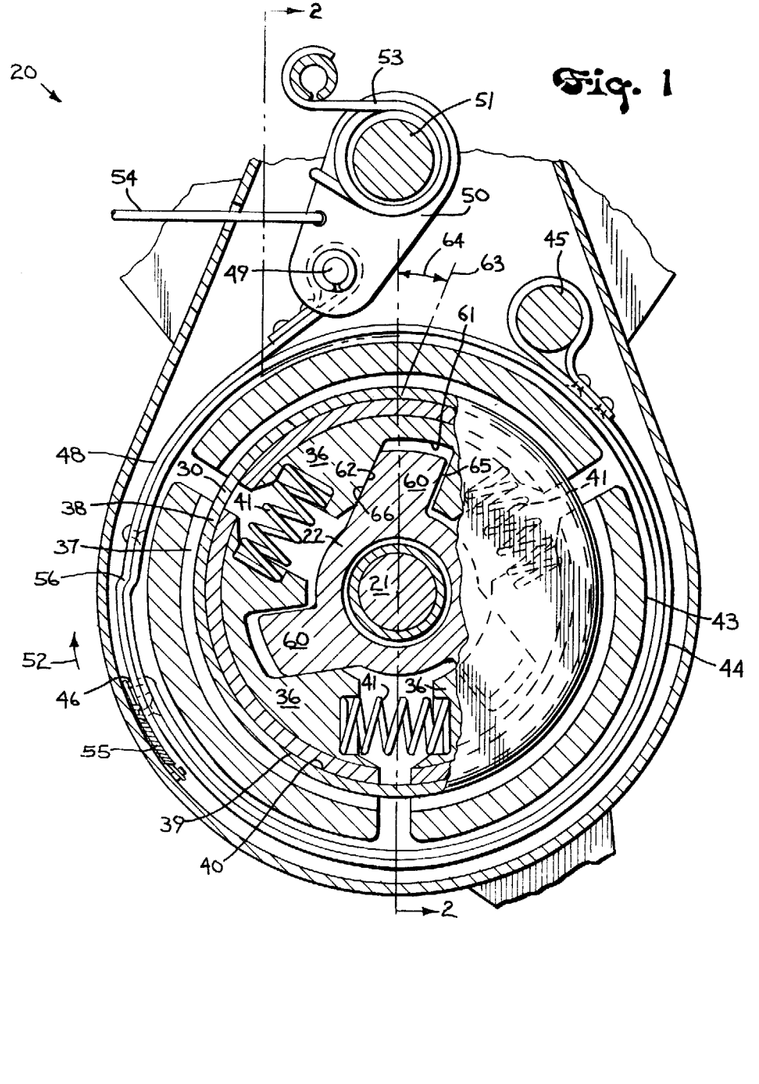
FIG. 1 is a sectional view of the clutch-brake mechanism of this invention and shows the mechanism with the clutch fully engaged in the drive mode.
Figure 2:
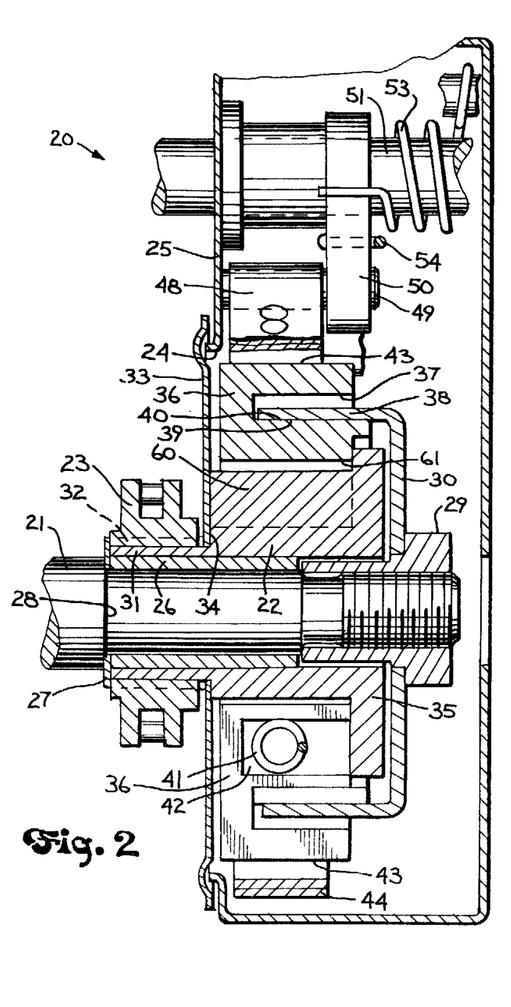
FIG. 2 is a sectional elevation of the clutch-brake mechanism taken generally on the line 2—2 of FIG. 1.

The tubular driven member or hub 22 is freely rotatable on the bearing sleeve 26 and generally extends between the washer 27 and the drum 30. The hub 22 includes an axial flange 31 on the inner end thereof adjacent to the washer 27 and which is provided with spline grooves 32 for drivingly mounting the cutting chain sprocket 23. A slinger plate disc 33 extends over the opening 24 in the housing 25 and is also carried by the driven hub 22 between the sprocket 23 and the stepped shoulder 34 on the driven member 22 to generally preclude the passage of sawdust, oil and other deleterious matter through the opening 24 into the housing 25. The hub 22 is provided with a radial flange 35 at the outer end thereof adjacent to the drum 30.

The clutch-brake mechanism 20 of this invention further includes a plurality of segmental clutch shoes 36, three (3) being shown, which are operatively disposed between the driving drum 30 and the driven member or hub 22. The clutch shoes 36 are freely movable radially and circumferentially within limits hereinafter described, and are confined axially between the hub flange 35 and the slinger disc 33.

The clutch shoes 36 are each provided with an arcuate, circumferentially extending recess 37 which opens in the direction of the drum 30. The recesses 37 extend over the full length of the several shoes 36 and form a continuous course for receiving the axially extending drum flange 38 therein as perhaps best shown in FIG. 2. The outwardly facing clutch surface 39 of the shoe recesses 37 assume a generally circular configuration to generally match that of and engage with the opposed inwardly facing surface 40 of the drum flange 38 when the shoes 36 are extended outwardly to their outermost position as generally shown in FIGS. 1 and 2. The clutch shoes 36 are normally biased outwardly by the coil springs 41 interposed between the ends of adjacent shoes and disposed in the opposed recessed seats 42 provided in the shoes.

The several shoes 36 are each provided with an arcuate peripheral braking surface 43 outwardly from the recesses 37. The braking surfaces 43 of the shoes 36 are engageable by the brake band 44 which is disposed around the outer periphery of the shoes. The brake band 44 is secured at one end to the fixed anchor post 45 provided in the housing 25 and extends more than 360° around the periphery of the shoes 36 to provide for somewhat more than 180° of overlap upon itself. The opposite end of the brake band 44 terminates with a radial projection 46 that projects outwardly through a circumferentially extending recess 47 in the band as generally shown in FIGS. 1-4 and 10. The projection 46 is movable in the recess 47 in accordance with expansion and contraction of the brake band 44 as explained hereinafter. On the side of the mechanism 20 opposite from the fixed anchor post 45, a brake band extension member 48 is secured to an intermediate portion of the brake band 44 and extends therefrom for connection to the movable anchor post 49 carried by the braking lever 50.

Figure 3:
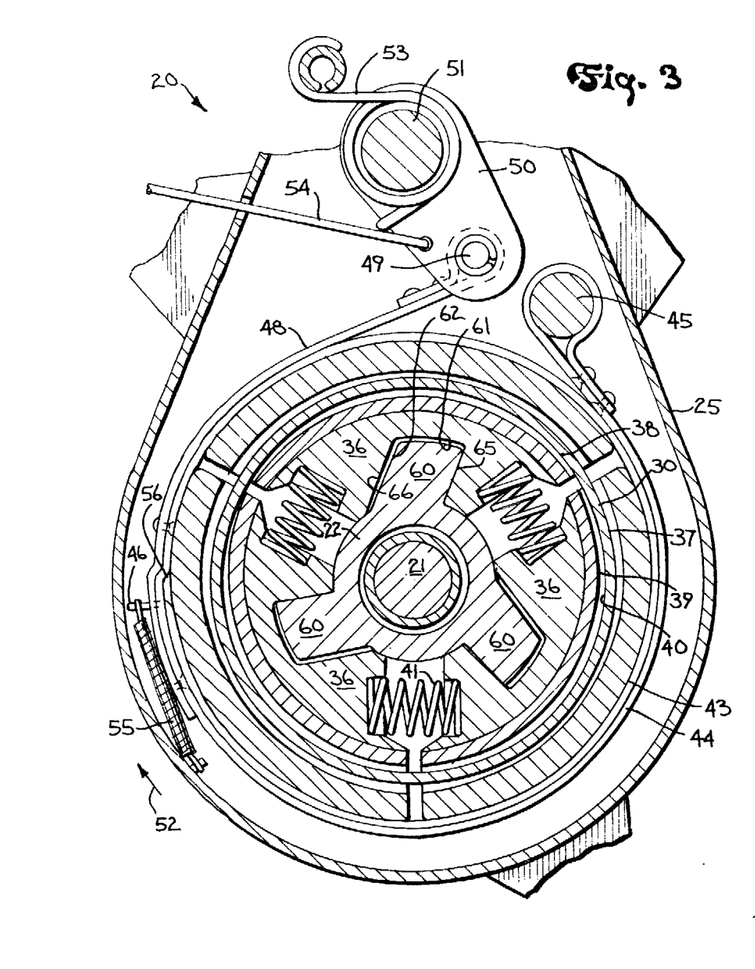
FIG. 3 is a sectional view generally similar to that of FIG. 1 and shows the mechanism with the brake engaged.

The braking lever 50 in turn is mounted on the housing post 51 and is pivotal thereon between an expanded brake-off condition, wherein the brake band 44 is spaced radially from the periphery of the shoes 36 and the clutch is engaged as generally shown in FIG. 1, and a contracted brake-on condition wherein the band engages with the peripheral surfaces 43 of the shoes to force the shoes inwardly and thereby simultaneously disengage the clutch and effect braking as generally shown in FIG. 3 without interruption of the engine or other drive source. With the shoes 36 rotating in the direction indicated by the arrow 52, the contracting brake band 44 is initially brought into contact with the shoes and then caused to frictionally wrap or tighten itself thereon so as to be self-energizing and thus effect a quick clutch release and a quick stopping of the driven member 22. In the braking position illustrated in FIG. 3, the braking surfaces 43 of the shoes 36 are generally disposed in a circular configuration or concentric relative to the shaft 21 and its drum 30.

The torsion spring 53 seated on the housing post 51 bears against the braking lever 50 to normally bias the lever to the brake-on position of FIG. 3 and is able to overcome the combined effect of the clutch energizing forces acting on the shoes 36. A manual force adequate to overcome the biasing force of the torsion spring 53 is required to move and thereafter hold the brake lever 50 in the brake-off condition as by the linkage member 54 connected at one end to the brake lever and at the other end to a deadman control or the like, not shown.

Figure 10:
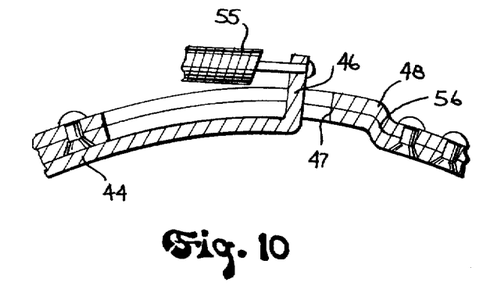
FIG. 10 is an enlarged sectional view of a portion of the brake band of FIG. 1 and shows the termination of the inner reach of the band.

A relatively small coil spring 55 is disposed between the outer end of the radial projection 46 of the brake band 44 and the housing 25 and acts to bias the projection toward the brake-off condition to thereby generally offset any tendency of the brake band taking on a set in the brake-on condition. Adjacent to the recess 47 and beyond the overlapping portion of the brake band 44, the brake band is offset inwardly at 56 an amount generally corresponding to the band thickness as shown in FIGS. 1 and 10. The offset at 56 serves to minimize wear at the terminus of the brake band 44 at projection 46 and generally maximizes the contact area between the brake band and the shoe surface 43 during brake engagement.

Figure 11:
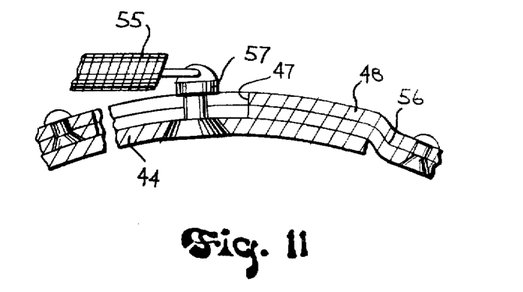
FIG. 11 is a view generally similar to that of FIG. 10 and shows a further embodiment of the termination of the inner reach of the brake band.

In the alternate embodiment of FIG. 11, a special rivet or the like 57 is spaced from the free end of the brake band 44 and projects outwardly through the recess 47. While the projecting rivet 57 is movable in the recess 47 in accordance with expansion and contraction of the brake band 44, the free end of the band extends and is movable in accordance with brake band movement beyond the recesses.

Figure 12:
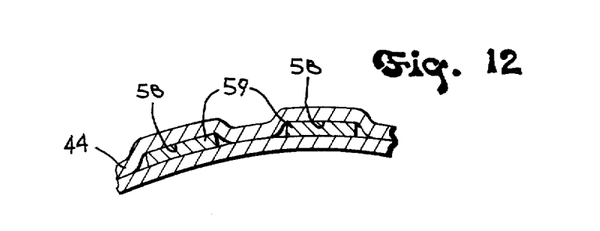
FIG. 12 is an enlarged sectional view of a portion of the brake band with provision for lubrication of the overlapped portion thereof.

To minimize the effect of friction between the overlapping portions of the brake band 44, a plurality of circumferentially spaced pockets 58 may be formed in the outer reach of the band portions as generally shown in FIG. 12. The pockets 58 are adapted to carry small lubricant impregnated blocks 59 in bearing relation to the adjacent face of the inner brake band portion to lubricate the superposed relatively sliding brake band surfaces. Alternatively, either or both of the facing surfaces of the overlapping portions of the brake band 44 may be coated with Teflon or generally similar material to minimize the friction therebetween.

While a straight centrifugal clutch would rely solely on spring pressure to effect clutch engagement, the clutch-brake mechanism 20 depicted as being for chain saw operation places only partial reliance on spring pressure as a clutch energizing force. As a consequence, the clutch springs 41 may be relatively light springs. Depending on engine horsepower and torque characteristics, it is contemplated that each shoe 36 will be biased by a pair of springs 41 exerting a biasing force of perhaps 5 to 15 lbs. each.

In addition to the biasing force of the relatively light springs 41, the energizing force for the clutch of the clutch-brake mechanism 20 includes a reactive force imposed on and by the driven member 22. To use the end load reactive force advantageously as a clutch energizing force, the driven member or hub 22 includes a plurality of circumferentially and equiangularly spaced drive projections 60 corresponding in number to the shoes 36. Each shoe 36 is provided with an opposed recess 61 to operatively receive the corresponding projection 60 of the hub 22. The recess 61 in each shoe 36 is disposed forwardly or generally adjacent to the leading end thereof.

The trailing side of the respective drive projections 60 on the hub 22 are provided with a cam ramp 62 whose radially outermost end is angularly advanced relative to the radially innermost end thereof. The cam ramp 62 is preferably convexly curved and the tangent line extension 63 therefrom defines a relatively small angle 64 relative to the radial centerline of the shoe 36 when in the drive position as generally shown in FIG. 1. The angle 64 is generally on the order of 20° but may vary in accordance with clutch characteristics desired. The opposite or leading side 65 of the projections 60 as shown in FIGS. 1-4 may be disposed on or near a radial line through the hub center. The trailing wall 66 of the shoe recess 61 is preferably concavely curved to generally match the curvature of the cam ramp 62 of the projection 60. As generally shown in FIG. 1, with the recess wall 66 engaged upon the cam ramp 62, the remaining walls of the shoe recess 61 generally parallel the corresponding sides of the hub projection 60 with operating clearance provided therebetween.

Figure 4:
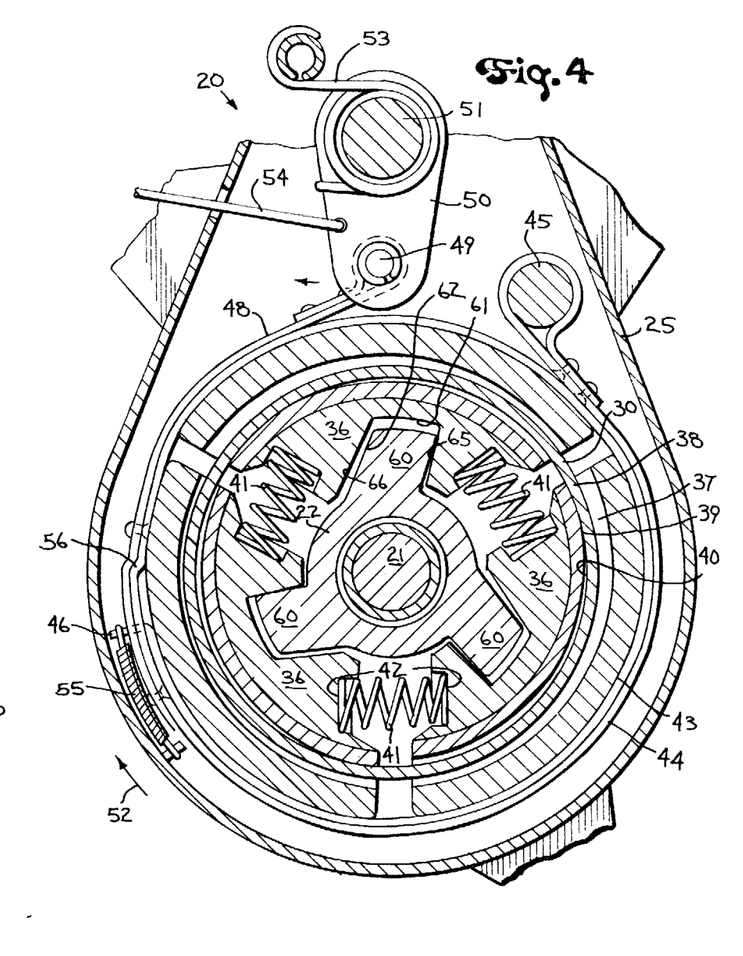
FIG. 4 is a sectional view generally similar to that of FIG. 1 and shows the mechanism in an intermediate condition when the brake is being released and the clutch shoes make initial contact with the driving drum.

To energize the clutch of the clutch-brake mechanism 20 from the brake-on condition with the power source driving the drum 30, the brake lever 50 is manually actuated through the linkage member 54 from its normal brake-on position of FIG. 3 as by a deadman control. As the brake lever 50 moves toward the full brake-off position of FIG. 1, the brake band 44 is expanded. FIG. 4 generally illustrates an intermediate condition of brake band expansion wherein the position of the band 44 allows the relatively light springs 41 to bias the clutch shoes 36 outwardly to make initial contact with the drum 30. Upon making initial contact, the torque of the driving drum 30 acts on the shoes 36 to drive the shoes against the angular cam ramps 62 of the corresponding hub projection 60. In view of the inertia or reactive force imposed by the end load upon the driven hub 22, the shoes 36 are forced outwardly on the cam ramp 62 to make full length engagement with the drum 30 and to wedge themselves solidly between the cam ramp and the drum to make a generally smooth, quick and forceful pickup of the load. Thus, the clutch of the clutch-brake mechanism 20 is self-energized and the energizing force derives not only from the relatively light springs 41 but also from the reactive force imposed by the end load on the hub 22. After the clutch is energized to pick up the load, the spring force and reactive force due to the load are augmented by centrifugal force which soon comes to dominate to maintain clutch engagement.

If the end load circumstance causes the power source to be lugged down, the centrifugal force will fall correspondingly to seemingly lessen the capacity of the clutch in the clutch-brake mechanism 20. However, it should be noted in the clutch-brake mechanism 20 of this invention that as the end load increases, the energizing force due to the reactive force imposed by the end load similarly increases to enhance the capacity of the clutch. Of course, if the clutch capacity is exceeded, the clutch will slip to generally protect the parts of mechanism 20.

To effect braking of the clutch-brake mechanism 20, the brake band 44 is contracted upon the braking surfaces 43 of the clutch shoes 36 to force the shoes out of engagement with the drum flange 38 and down the cam ramps 62 as the shoe rotation is being bolted. In the braking procedure, the inertia of the drive member 22 brings the leading side 65 of the hub projection 60 into contact with the opposed face of the shoe recess 37 to bolt or interrupt rotation of the driven member.

Figure 5:
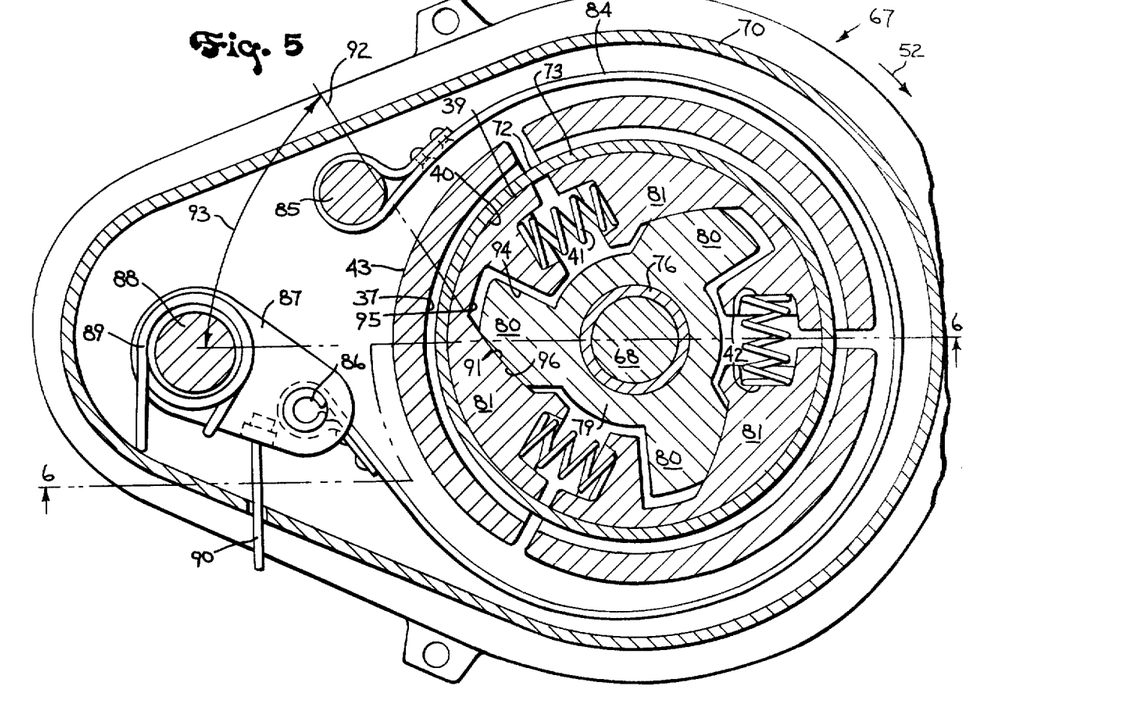
FIG. 5 is a sectional view showing a further embodiment of the clutch-brake mechanism of this invention with the clutch fully engaged in the drive condition.
Figure 6:
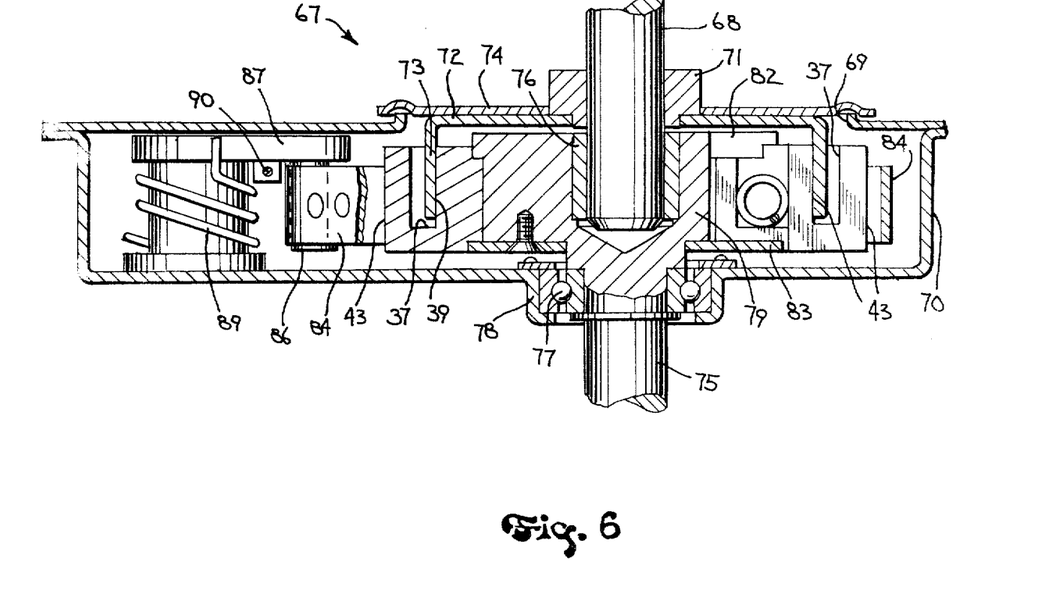
FIG. 6 is a sectional elevation taken generally on line 6—6 of FIG. 5.

The clutch-brake mechanism 67 generally depicted in FIGS. 5 and 6 is intended specifically for use in a lawn mower, but likely may be readily adapted for use in other applications.

In the mechanism 67, the drive shaft 68 from an engine or other power source, not shown, extends through the opening 69 into the housing 70 adapted for securement beneath the lawn mower deck, not shown. A hub member 71 is fixedly secured adjacent to the end of the drive shaft 68 and carries for rotation with the shaft the drum 72 having a circumferential flange 73 projecting axially downwardly. The hub member 71 also carries a slinger plate disc 74 which spans the opening 69 to the housing 70 to generally preclude entry of grass and other deleterious matter into the housing. The driven shaft 75 is piloted on the end of the drive shaft 68 with a bearing sleeve 76 interposed therebetween. The driven shaft 75 is rotatably supported by the ball bearing 77 disposed in the cup projection 78 formed in the floor of the housing 70. The grass cutting element, not shown, will be carried on the lower end of the driven shaft 75 beneath the housing 70.

The upper end of the driven shaft 75 within the housing 70 includes an enlarged hub portion 79 having a plurality of circumferentially and equiangularly spaced projections 80. The drive projections 80 correspond in number to the segmental clutch shoes 81 of the mechanism 67, with three (3) shoes being shown. The clutch shoes 81 are movable radially and circumferentially within limits hereinafter described, and are confined axially between the radial flange 82 of hub portion 79 and the opposed hub plate 83.

As in the case of shoes 36 of the previously described clutch brake mechanism 20, the shoes 81 are provided with an arcuate, circumferentially extending recess 37 for receiving the drum flange 73. The outwardly facing surface 39 of the shoe recesses 37 assume a circular configuration to match the opposing surface of the drum flange 73 when the shoes 81 are biased outwardly to their outermost drive position as generally shown in FIG. 5. The relatively light clutch springs 41 normally bias the shoes 81 outwardly. In the case of a lawn mower, the clutch springs 41 are each contemplated to exert a biasing force of 3-10 lbs. depending on engine horsepower and torque characteristics. Similarly to the clutch shoes 36, the shoes 81 are provided with a peripheral braking surface 43 which generally define a circular configuration in the contracted or brake-on position of the shoes.

The brake band 84 is secured at one end to the fixed anchor post 85 of housing 70 and extends around the periphery of the shoes 81. The opposite end of the brake band 84 is secured around the movable post 86 carried by the braking lever 87. The brake band overlap as provided in the clutch brake mechanism 20 of FIGS. 1-4 is generally not necessary for a lawn mower because even without overlap the time required for stopping rotation of the cutting element by the brake band 84 will be well within the time prescribed by law.

Braking lever 87 is mounted on the housing post 88 and is pivotal thereon between the brake-off position as generally shown in FIG. 5 and the brake-on position, not shown, but corresponding generally to the brake-on position for brake lever 50 as shown in FIG. 3. In the brake-off position of FIG. 5, the brake band 84 is expanded in spaced relation from the clutch shoes 81 and the clutch is engaged. The braking lever 87 is movable counter-clockwise from the brake-off position of FIG. 5 to the brake-on position wherein the brake band 84 is contracted into engagement with the peripheral braking surfaces 43 of the shoes 81 to simultaneously effect a disengagement of the shoes from the driving drum 72 against the biasing force of the clutch springs 41 and braking of the driven shaft 75. The torsion spring 89 disposed on the housing post 88 bears on the braking lever 87 and normally biases the lever to the brake-on position. The braking lever 87 is manually movable against the biasing force of spring 89 from the brake-on position to the brake-off position as by the linkage member 90 connected at one end to the braking lever and at the other end to a deadman control or the like, not shown.

The clutch-brake mechanism 67 of FIGS. 5 and 6 also utilizes to good advantage the inertia or reactive force imposed by the driven member 75 and its end load to energize the clutch. To this end the trailing side of the projections 80 on driven member hub portion 79 are provided with the convexly curved cam ramp 91 whose radially outermost end is angularly advanced relative to the radially innermost end thereof. The tangent line extension 92 for the cam ramps 91 define the angle 93 relative to the radial centerline of the clutch shoes 81 when in the drive position as generally shown in FIG. 5. The angle 93 is generally on the order of 55° and may vary in accordance with the clutch characteristics desired. The opposed or leading side 94 of projections 80 are disposed on or near a radial line through the hub center generally similar to the leading side 65 on hub projections 60 of the clutch-brake mechanism 20. The recess 95 in the clutch shoes 81 for receiving the projections 80 includes a trailing wall portion 96 which is concavely curved to generally match the curvature of the cam ramp 91. The remaining walls of the shoe recesses 95 are generally parallel to the corresponding surfaces of the hub projections 80 with operating clearance provided therebetween as generally shown in FIG. 5.

The clutch characteristics believed necessary for a lawn mower differ somewhat from those for a chain saw. If the grass cutting element of a lawn mower meets an obstruction that even only momentarily interrupts rotation of the cutting element, slippage between the clutch shoes 81 and the drum 72 is required to generally protect the clutch-brake mechanism 67 and/or the engine or other power source. Other than when the cutting element meets with an obstruction, clutch slippage in a lawn mower clutch is generally not desired because the heat generated by any substantial slippage between the clutch shoes 81 and the driving drum 72 is likely to deleteriously affect the parts of the clutch-brake mechanism 67 and might even conceivably ignite dry grass.

The clutch of the clutch-brake mechanism 67 is self-energizing in much the same manner as described previously for the clutch-brake mechanism 20. When the brake lever 87 is manually manipulated as by a deadman control from the brake-on position to thd brake-off position with the engine or other power source running, the brake band 84 is expanded thereby to permit the clutch shoes 81 to move outwardly by reason of the biasing force exerted on the shoes by the springs 41. After at least some portion of the clutch shoes 81 make initial contact with the driving drum 72, the shoes are forced toward the respective angular cam ramps 91 on the projections 80. The inertia or reactive force imposed by the end load on the driven member 75 forces the clutch shoes 81 outwardly on the cam ramps 91 to solidly wedge the shoes between the ramps and the drum to effect a forceful and generally smooth pickup of the load. Thus, the initial pickup of the load is effected by a relatively light spring force together with a reactive force imposed by the end load. After the load is rotationally picked up by the engaged clutch, centrifugal force is added and generally dominates to maintain clutch engagement.

It was pointed out relative to the clutch-brake mechanism 20 of FIGS. 1-4 and is also applicable to the clutch-brake mechanism 67 of FIGS. 5 and 6, that with increases in the end load the centrifugal energizing force exerted by the clutch shoes on the driving drum will fall as the power source is lugged down tending to lessen the capacity of the clutch while at the same time the reactive energizing force imposed by the end load will increase to enhance the capacity of the clutch. In the embodiment of FIGS. 5 and 6, it is intended that the relatively large angle 93 for the cam ramps 91 will so increase the reactive energizing force imposed by the end load when the power source is being lugged down that the clutch capacity will continue to exceed the power source capacity so that the power source will die before the clutch will slip when encountering excessive loads.

In the clutch-brake mechanisms 20 and 67 heretofore described in connection with FIGS. 1-6, consistent and reliable clutch and braking operations generally required that the corresponding clutch and brake surfaces remain generally dry and clean. The clutch-brake mechanism 97 depicted in FIGS. 7-9 contemplates a "wet" environment for consistent and reliable clutch and braking operations.

Figure 9:
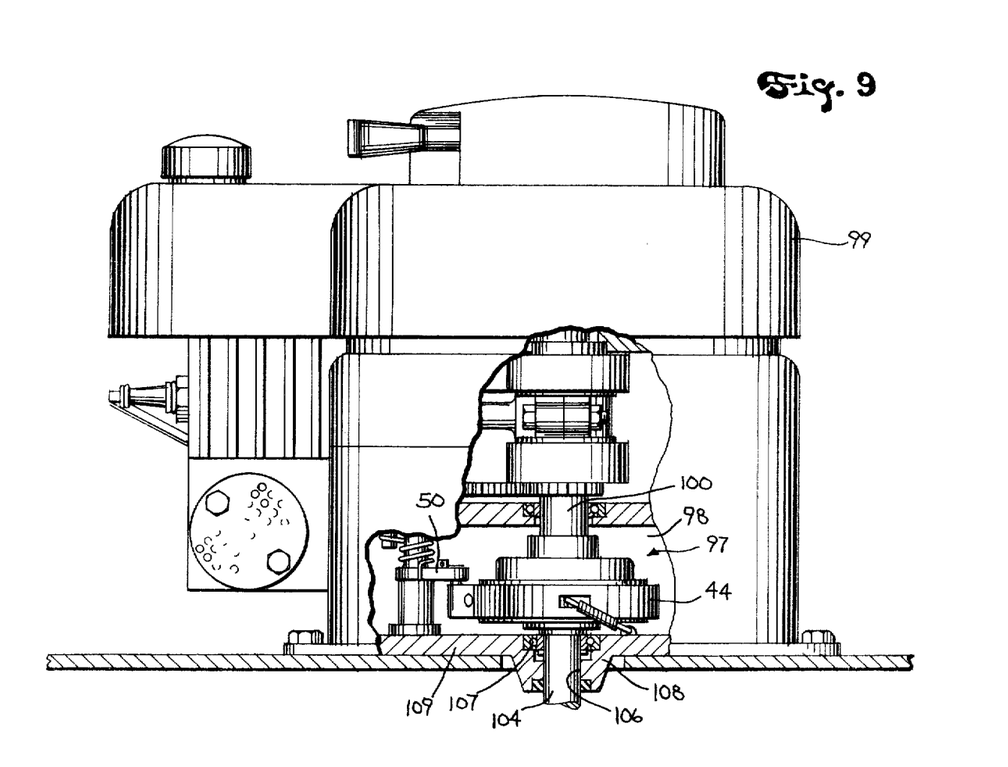
FIG. 9 is an elevational view of an engine with parts broken away to show the clutch-brake mechanism of FIG. 7 incorporated within the engine housing.

Referring to FIG. 9, the clutch-brake mechanism 97 is shown disposed in a chamber 98 which may be the crankcase or other chamber of a two (2) or four (4) cycle engine 99 for a lawn mower or other implement. In the engine chamber 98, the clutch-brake mechanism 97 is operatively disposed in an oil vapor or oil bath environment wherein the friction characteristics of the clutch and brake surfaces are materially reduced as compared to their generally dry counterparts.

Figure 7:
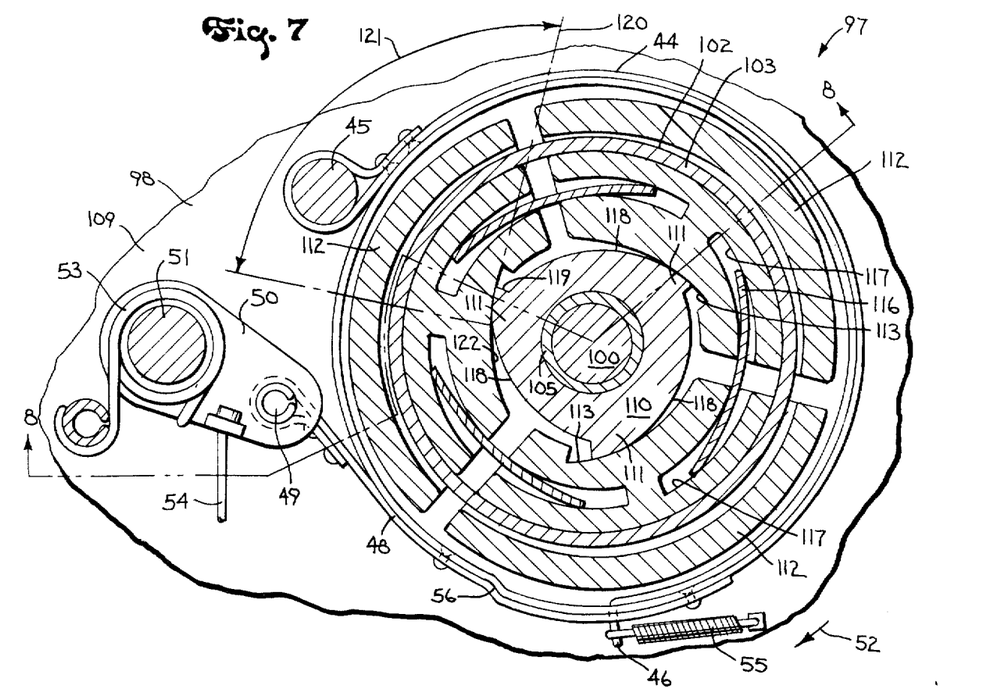
FIG. 7 is a sectional view showing a still further embodiment of the clutch-brake mechanism with the clutch fully engaged in the drive condition.
Figure 8:
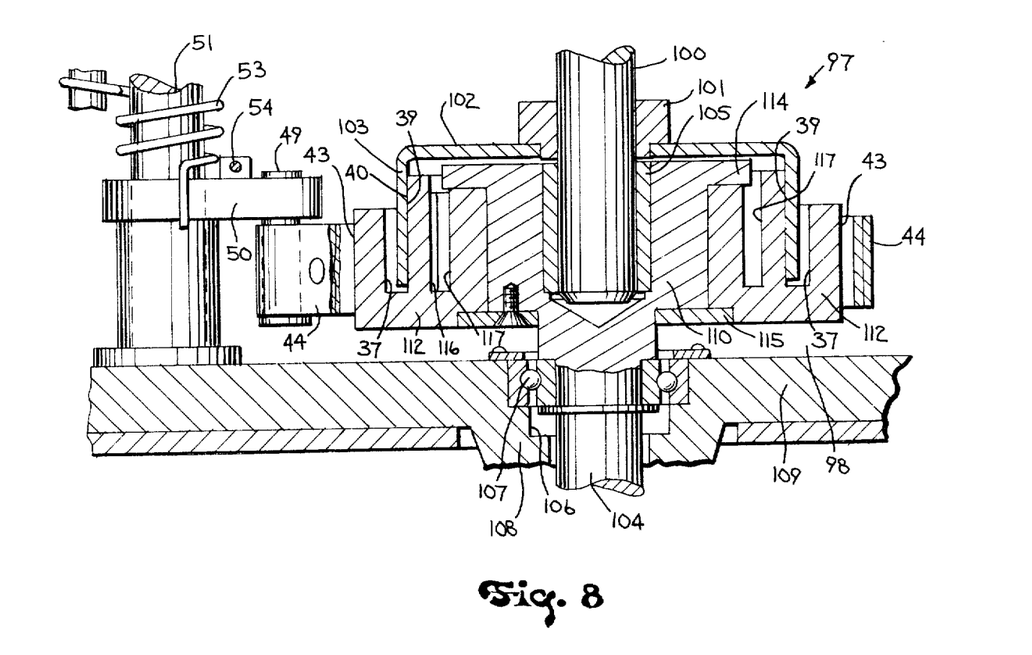
FIG. 8 is a sectional view taken generally on line 8—8 of FIG. 7.

In the clutch-brake mechanism 97, the engine shaft 100 extends into the chamber 98 and carries the hub member 101 mounting the drive drum 102 having a circumferential flange 103 projecting axially downwardly. The driven shaft 104 is piloted on the end of the engine shaft 100 with a bearing sleeve 105 disposed therebetween. The driven shaft 104 extends downwardly through the opening 106 and is rotatably supported by the ball bearing 107 disposed around the opening in the cup projection 108 in the floor 109 for chamber 98.

The driven shaft 104 is provided with an enlarged hub portion 110 having a plurality of equiangularly spaced projections 111. The projections 111 correspond in number to the segmental clutch shoes 112, three (3) being shown, having corresponding recesses 113 for the projections. The shoes 112 are confined axially between the radial flange 114 of hub portion 110 and the opposed hub plate 115.

As in the case of the clutch-brake mechanism 20, the clutch shoes 112 are each provided with the circumferentially extending recess 37 for receiving the drum flange 103 and the outwardly facing surface 39 of the recesses 37 assume a circular configuration to match the opposing surface of the drum flange when the shoes are in their outermost drive position. The clutch shoes 112 are normally biased outwardly toward the drive position by the leaf springs 116 that are disposed between adjacent shoes in the generally aligned recesses 117. In view of the "wet" environment of chamber 98, the clutch springs 116 may have to exert somewhat more of a biasing force than the 3-10 lbs. contemplated for the springs 41 in the clutch-brake mechanism 67. The clutch shoes 112 are similarly provided with a peripheral braking surface 43 defining a circular configuration in the contracted or brake-on position of the shoes.

It is contemplated that the overlapped brake band 44 of the clutch-brake mechanism 20 will be desired in the "wet" circumstance of chamber 98 in view of the materially reduced friction characteristics between the brake band and the braking surfaces 43 on the clutch shoes 112. The actuating mechanism for the brake band 44 of the clutch-brake mechanism 20 may also be employed for the clutch-brake mechanism 97 of FIGS. 7-9. However, it must be understood that the torsion spring 53 must be "tailored" to overcome the clutch leaf springs 116 to assure that braking lever 50 will be normally biased to the brake-on position.

In the "wet" environment of chamber 98, the cam ramps 118 on the trailing side of the hub projections 111 comprise generally long arcuate surfaces wherein the radially outermost ends are angularly advanced relative to the radially innermost ends. In FIG. 7, the cam ramps 118 are shown to extend circumferentially from the base of the generally radial leading face 119 of one hub projection 111 to the tip of the generally radial leading face of the adjacent projection or for 120°. The tangent line extension 120 for the cam ramps 118 define a large angle 121 relative to the radial centerline of a clutch shoe 112 in the drive position as generally shown in FIG. 7. The angle 121 is on the order of 80° to provide for a substantial wedging effect for the clutch shoes 112, but can vary in accordance with the clutch characteristics desired. The recesses 113 in the clutch shoes 112 each include an arcuate trailing surface 122 generally similar to that of the cam ramps 118, which as generally shown in FIG. 7, engage or wedge upon only a portion of the corresponding cam ramps in the drive circumstance.

The leading surface of the clutch shoe recesses 113 generally parallel the opposed radial leading face 119 of the hub projections 111.

The clutch of the clutch-brake mechanism 97 is also self-energizing in the manner previously described. After the brake is released, the clutch shoes 112 are biased outwardly by the clutch springs 116. After making initial contact with the rotating drum 102, the clutch shoes 112 are forced against their corresponding cam ramp 118. Thereafter, the inertia or reactive force imposed by the end load on the driven member 104 forces the clutch shoes 112 outwardly or up the cam ramps 118 to effectively wedge the shoes between the cam ramps and the drum to effect rotational pick up of the load. Thus, the spring force is augmented by the reactive energizing force imposed by the end load to provide for generally smooth, quick and forceful clutch engagement and pickup of the load.

Various modes of carrying out the invention are contemplated as being within the scope of the following claims particularly pointing out and distinctly claiming the subject matter which is regarded as the invention.

I claim:

1. In a clutch-brake mechanism for disposition between coaxial drive and driven members rotatable in a given direction, a drum carried on said drive member, a clutch shoe disposed between the driven member and the drive drum and being movable radially and circumferentially therebetween into and out of clutching engagement with the drum, a projection on said driven member and extending into a corresponding recess provided in said shoe, a cam ramp provided on the trailing side of the projection and being engageable by the shoe, the radially outermost end of the cam ramp being angularly advanced relative to the radially innermost end thereof, means for effecting movement of the shoe generally radially toward engagement with the rotating drum, and upon contact with the drum, said shoe being forced circumferentially into contact with the cam ramp, the load imposed on and by the driven member giving rise to a reactive energizing force to effect movement of the shoe outwardly on the cam ramp and into clutching engagement with the rotating drum to rotationally pick up the driven member, a braking surface on the clutch shoe, and a brake band member movable between an expanded condition wherein the brake band is spaced outwardly from the shoe and a contracted condition wherein the brake band engages the braking surface on the shoe to displace the shoe inwardly out of clutching engagement with the drum and to stop rotation of the driven member without interrupting the rotation of the drive member.

2. In a clutch-brake mechanism for disposition between coaxial drive and driven members rotatable in a given direction, a drum carried on said drive member, segmental clutch shoes disposed between the driven member and the drive drum and being movable radially and circumferentially therebetween into and out of clutching engagement with the drum, a plurality of equiangularly spaced projections provided on said driven member and corresponding to the number of clutch shoes, each said projection extending outwardly into a corresponding recess provided in the respective clutch shoes, a cam ramp provided on the trailing side of each projection and being engageable by the corresponding shoe, the radially outermost end of the respective cam ramps being angularly advanced relative to the radially innermost end thereof, means for effecting movement of the shoes generally radially toward engagement with the rotating drum, and upon contact with the drum, said shoes being forced circumferentially into contact with the corresponding cam ramp, the load imposed on and by the driven member giving rise to a reactive energizing force to effect movement of the clutch shoes outwardly on the respective cam ramps and into clutching engagement with the rotating drum to rotationally pick up the driven member, a braking surface on the clutch shoes, and a brake band member movable between an expanded condition wherein the brake band is spaced outwardly from the clutch shoes and a contracted condition wherein the brake band member engages the braking surface on the clutch shoes to displace the shoes inwardly out of clutching engagement with the drum and to stop rotation of the driven member without interrupting the rotation of the driven member.

3. The structure as set forth in claim 2 wherein the means for effecting movement of the clutch shoes generally radially outwardly toward engagement with the rotating drum comprises spring means.

4. The structure as set forth in claim 3 wherein the spring means comprise coil springs that extend between the ends of adjacent clutch shoes.

5. The structure as set forth in claim 3 wherein the spring means comprise leaf springs extending between and disposed within aligned recesses provided in the ends of adjacent clutch shoes.

6. The structure as set forth in claim 3 wherein the spring means exert a biasing force of less than 15 pounds per clutch shoe.

7. The structure as set forth in claim 2 wherein the cam ramps form a relatively shallow angle relative to the radial centerline of the corresponding clutch shoe in the clutch engaged position and thereby provide for clutch slippage when the drive member capacity exceeds the clutch capacity.

8. The structure as set forth in claim 2 wherein the cam ramps form a relatively large angle relative to the radial centerline of the corresponding clutch shoe in the clutch engaged position and thereby provide for a clutch capacity that exceeds the capacity of the drive member to generally preclude clutch slippage.

9. The structure as set forth in claim 2 wherein the cam ramp is convexly curved.

10. The structure as set forth in claim 9 wherein the surfaces of the respective clutch shoe recesses engageable with the cam ramps are concavely curved to generally match the curvature of the cam ramps.

11. The structure as set forth in claim 2 wherein the leading side of the driven member projections extend generally radially.

12. The structure as set forth in claim 2 wherein the drive member comprises a drive shaft and the driven member comprises a tubular member freely rotatable on the drive shaft.

13. The structure as set forth in claim 2 wherein the drive member comprises a drive shaft and the driven member comprises a shaft piloted upon the end of the drive shaft.

14. The structure as set forth in claim 2 wherein the mechanism is disposed within a housing.

15. The structure as set forth in claim 14 wherein the housing comprises a chamber in an engine housing.

16. The structure as set forth in claim 15 wherein the engine chamber is the engine crankcase.

17. The structure as set forth in claim 2 wherein the driven member is provided with three equiangularly spaced projections to accommodate a like number of segmental clutch shoes.

18. The structure as set forth in claim 2 wherein the brake band extends circumferentially relative to the braking surfaces of the clutch shoes and has one end thereof connected to a fixed anchor and the other end thereof connected to a movable anchor.

19. The structure as set forth in claim 2 wherein the brake band extends circumferentially more than 360° relative to the braking surfaces of the clutch shoes so that at least a portion of the brake band is disposed in superposed overlapping relation upon itself.

20. The structure as set forth in claim 19 wherein the relatively sliding brake band surfaces in the overlapped portion thereof are lubricated.

21. The structure as set forth in claim 20 wherein circumferentially spaced inwardly opening pockets are formed in the outer reach of the overlapped portion of the brake band and lubricant blocks are carried in the pockets in bearing relation with the adjacent surface of the inner reach of the overlapped portion of the brake band.

22. The structure as set forth in claim 19 wherein the outer reach of the overlapped portion of the brake band is provided with a circumferentially extending recess adjacent to the terminus of the inner reach of the brake band, and means projecting outwardly through the recess from adjacent the terminus of the inner reach of the brake band to maintain the superposed relation in the overlapped portion of the brake band, said brake band being offset inwardly adjacent to the recess in the nonoverlapped portion thereof to substantially preclude wear at the terminus of the inner reach of brake band.

23. The structure as set forth in claim 22 wherein the means projecting outwardly through the recess from adjacent the terminus of the inner reach of the brake band comprises a radial projection at the terminus of the brake band.

24. The structure as set forth in claim 22 wherein the means projecting outwardly through the recess from adjacent the terminus of the inner reach of the brake band comprises a rivet secured to the inner reach of the brake band.

25. The structure as set forth in claim 22 wherein a spring is connected to the means projecting outwardly through the recess from adjacent the terminus of the inner reach of the brake band and acts to bias the projecting means toward the brake-off condition to overcome any tendency of the brake band to take on a set in the brake-on condition.

* * * * *